US008533701B2

(12) United States Patent
Khalidi et al.

(10) Patent No.: US 8,533,701 B2
(45) Date of Patent: Sep. 10, 2013

(54) VIRTUAL MACHINE IMAGE UPDATE SERVICE

(75) Inventors: Yousef A. Khalidi, Bellevue, WA (US); Jeffrey Lee Havens, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 723 days.

(21) Appl. No.: 12/724,010

(22) Filed: Mar. 15, 2010

(65) Prior Publication Data

US 2011/0225574 A1    Sep. 15, 2011

(51) Int. Cl.
*G06F 9/44* (2006.01)
*G06F 9/45* (2006.01)

(52) U.S. Cl.
USPC .......................................... 717/168; 717/171

(58) Field of Classification Search
USPC ........................... 717/168–173; 709/203–204
See application file for complete search history.

(56) References Cited

U.S. PATENT DOCUMENTS

| | | | | |
|---|---|---|---|---|
| 6,487,718 B1 * | 11/2002 | Rodriguez et al. | ............. | 717/177 |
| 6,954,929 B2 * | 10/2005 | Erickson et al. | ............. | 717/173 |
| 7,197,535 B2 * | 3/2007 | Salesky et al. | ................ | 709/204 |
| 7,299,463 B2 * | 11/2007 | Brannock et al. | ............. | 717/169 |
| 7,334,224 B2 * | 2/2008 | Haga et al. | ..................... | 717/168 |
| 7,376,944 B2 * | 5/2008 | Crisan et al. | ................... | 717/171 |
| 7,496,576 B2 | 2/2009 | Bernabeu-Auban | | |
| 7,516,450 B2 * | 4/2009 | Ogura | ........................... | 717/168 |
| 7,549,148 B2 * | 6/2009 | Cross et al. | ................... | 717/174 |
| 7,552,430 B2 * | 6/2009 | Napier et al. | ................. | 717/169 |
| 7,590,653 B2 * | 9/2009 | Sparks | .................................. | 1/1 |
| 7,594,003 B2 | 9/2009 | Davidson | | |
| 7,610,334 B2 * | 10/2009 | Henocq et al. | ................. | 709/203 |
| 7,653,901 B2 * | 1/2010 | Tameshige et al. | ........... | 717/168 |
| 7,685,148 B2 * | 3/2010 | Engquist et al. | .............. | 709/201 |
| 7,698,698 B2 * | 4/2010 | Skan | ............................. | 717/168 |
| 7,886,288 B2 * | 2/2011 | Breckner et al. | .............. | 717/168 |
| 7,890,919 B1 | 2/2011 | Williams | | |
| 7,996,829 B2 * | 8/2011 | Depew et al. | ................. | 717/170 |
| 8,291,406 B2 * | 10/2012 | Milne et al. | .................... | 717/171 |
| 8,365,159 B2 * | 1/2013 | Borlick et al. | ................ | 717/168 |
| 8,387,037 B2 * | 2/2013 | Henseler et al. | ............. | 717/168 |
| 2006/0010435 A1 | 1/2006 | Jhanwar et al. | | |
| 2006/0026585 A1 | 2/2006 | Haselden et al. | | |

(Continued)

OTHER PUBLICATIONS

Rodrigues et al, "Improving multiside recurrent pattren image coding with enhanced dictionary updating strategies", IEEE, pp. 257-262, 2006.*

(Continued)

*Primary Examiner* — Anil Khatri
(74) *Attorney, Agent, or Firm* — Shook Hardy & Bacon LLP (57) ABSTRACT

Systems, methods, and computer-readable media for updating a component utilized by an application within a distributed computing environment. An inventory of components relied on by applications within a distributed computing environment is created and maintained to facilitate identifying applications utilizing a particular component. A determination is made from the inventory of applications that utilize the particular component. An indication is received that an update is available for the particular component. An application image for an application utilizing the particular component is booted in an isolated computing environment to allow the component to be updated. A new image of the application is created to reflect the updated component. A user, such as a developer, of the application may be notified that the new image is available for future instantiations of the application.

18 Claims, 6 Drawing Sheets

(56) References Cited

U.S. PATENT DOCUMENTS

| | | |
|---|---|---|
| 2006/0085785 A1 | 4/2006 | Garrett |
| 2007/0074201 A1 | 3/2007 | Lee |
| 2007/0134068 A1 | 6/2007 | Smith |
| 2008/0083030 A1 | 4/2008 | Durham |
| 2008/0163210 A1 | 7/2008 | Bowman |
| 2009/0037680 A1 | 2/2009 | Colbert |
| 2009/0083404 A1 | 3/2009 | Lenzmeier |
| 2009/0300607 A1 | 12/2009 | Ferris |
| 2010/0146481 A1 | 6/2010 | Binder et al. |

OTHER PUBLICATIONS

Zhou et al, "Scalar quantization forlarge scale image search", ACM 169-178, 2012.*

Milazzo et al, "Handling run time updates in distributed applications" ACM SAC, pp. 1375-1380, 2005.*

Gracioli et al, "An operating system infrastructure for remote code update in deeply embedded systems", ACM HotSWUp, pp. 1-5, 2008.*

Why Do Upgrades Fail and What Can We Do about It? Toward Dependable, Online Upgrades in Enterprise System—Published Date: 2009 http://www.ece.cmu.edu/~tdumitra/public_documents/dumitras09whydoupgradesfail.pdf.

Virtualization for High Performance Computing—Published Date: 2006 http://researchweb.watson.ibm.com/K42/papers/osr06-virt.pdf.

Building a Large-Scale Information System for the Education Sector: A Project Experience—Published Date: May 28, 2005 http://stanislaw.osinski.name/papers/pdf/gruszczynski-iceis2005.pdf.

Mobile Web Access Using eNetwork Web Express—Published Date: Oct. 1998 http://www.comsoc.org/pci/private/1998/oct/pdf/Floyd.pdf.

Notification of Transmittal of the International Search Report and the Written Opinion of the International Searching Authority, or the Declaration in PCT/US11/028156, dated Nov. 28, 2011, 10 pages.

* cited by examiner

VIRTUAL MACHINE IMAGE UPDATE SERVICE

BACKGROUND

A distributed computing system is employed in a variety of settings for running applications and maintaining data. For example, an application traditionally stored and maintained on a personal computer for performing one or more desired functions, may, when executed in a distributed computing system, provide similar functionality without the need for local resources, maintenance, and other burdens associated with individual copies of an application residing at a personal computer.

An application that is accessible through a distributed computing system (environment) may include features particular to a specific group of users. These features that are particular to a specific group of users inhibit traditional automation of an update to components utilized by the application. Traditionally, when a distributed computing system application is updated, the process is laborious and results in manual intervention to re-instate many of the features unique to the application prior to the update. Consequently, a user, such as a developer of the application, initiates the update process to re-deploy the features and customization that was present prior to updating of a component within the application.

Further, a user initiating the update of a component used by an application is traditionally required to have knowledge that the component is used by a particular application and that an update for the component is present. As a result, updating of a component across a distributed computing environment is hindered by the lack of centralization and automation for updating components system wide.

As such, current processes for updating components of applications, which rely on users manually identifying an update is available and rebuilding an application, are ad hoc solutions, are labor intensive, and are error prone. Further, these solutions are not scalable for applying across a distributed computing environment providing a plurality of applications with multiple components utilized therein and identifying an update is available.

SUMMARY

Embodiments of the present invention relate to systems, methods and computer storage media for updating a component utilized by an application within a distributed computing environment. An inventory of components relied on by applications within a distributed computing environment is created and maintained to facilitate identifying applications utilizing a particular component. A determination is made of applications that utilize a particular component. An indication is received that an update is available for the particular component used by an application. An application image for the application utilizing the particular component is booted in an isolated computing environment to allow the component to be updated with respect to the application. The component used by the application is updated within the isolated computing environment. A new application image of the application is created to reflect the updated component. In an exemplary embodiment, a user, such as a developer, of the application is notified that the new application image reflecting the updated component is available for future instantiations of the application within the distributed computing environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Embodiments of the present invention relate to systems, methods and computer storage media for updating a component utilized by an application within a distributed computing environment. An inventory of components relied on by applications within a distributed computing environment is created and maintained to facilitate identifying applications utilizing a particular component. A determination is made of applications that utilize a particular component. An indication is received that an update is available for the particular component. An application image for an application utilizing the particular component is booted in an isolated computing environment to allow the component to be updated. A new image of the application is created to reflect the updated component. In an exemplary embodiment, a user, such as a developer, of the application is notified that the new image is available for future instantiations of the application.

Accordingly, in one aspect, the present invention provides computer storage media having computer-executable instructions embodied thereon, that when executed by a computing system having a processor and memory, cause the computing system to perform a method for updating an application image with a component. The method includes automatically determining the component is utilized by a service that is accessible through a distributed computing environment, wherein the service is an instantiation of an application represented by the application image. The method also includes receiving an indication that an update for the component is available. Further, the method includes identifying the application image is utilizing the component. Additionally, the method includes automatically executing the application image in an isolated computing environment of the distributed computing environment to update the component. The method also includes storing, within the distributed computing environment, a new application image reflecting the application having the component updated.

In another aspect, the present invention provides a computer system for performing a method for updating a component of an application image, the computer system comprising a processor coupled to a computer storage medium, the computer storage medium having stored there on a plurality of computer software executable by the processor. The computer software includes a receiving service for receiving an update to a component utilized by one or more applications in a distributed computing environment. The computer software also including a component update service for automatically identifying an application image, for an application of the one or more applications, utilizing the component. The component update service executing the application image in a virtual machine that is an isolated computing environment within the distributed computing environment. Additionally, the component update service is functional for facilitating an update agent with applying the update to the component in the isolated computing environment. The component update service facilitates storing a new image of the application.

A third aspect of the present invention provides computer storage media having computer-executable instructions embodied thereon, that when executed by a computing system having a processor and memory, cause the computing system to perform a method for updating an application image with a component. The method includes determining a plurality of components utilized by an application that is represented by an application image. The method also includes recording the plurality of components as an inventory. Further, the method includes receiving an indication of an update for a component of the plurality of components. Additionally, the method includes automatically identifying from the inventory; the application image utilizes the component. The method also includes executing the application image in an isolated computing environment of the distributed computing system. The method further includes receiving the update for the component at the isolated computing environment. The method also includes facilitating update of the component within the isolated computing environment. The method additionally includes verifying the component is updated within the isolated computing environment. The method also includes creating a new application image of the application utilizing the updated component. The method also includes storing the new application image within the distributed computing environment. Additionally, the method includes notifying a user of the application that the new application image is available within the distributed computing environment.

Having briefly described an overview of embodiments of the present invention, an exemplary operating environment suitable for implementing embodiments hereof is described below.

Figure 1:
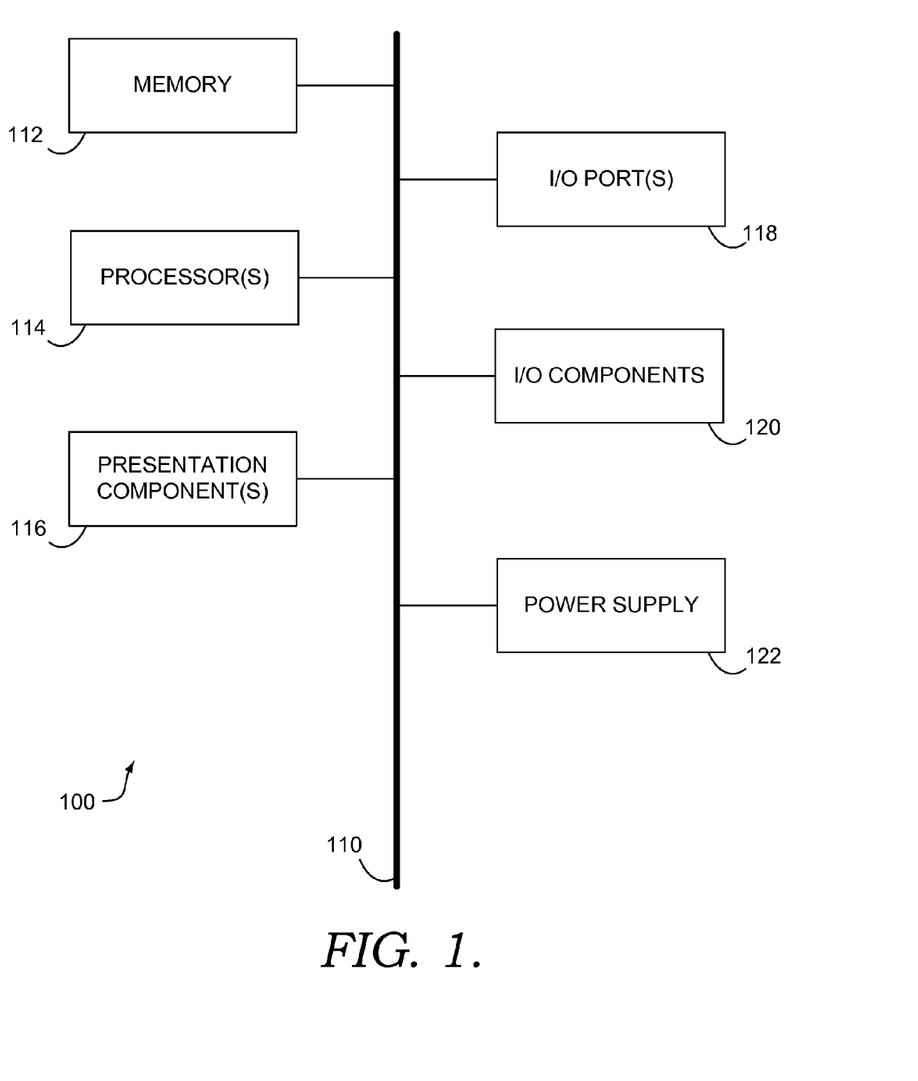
FIG. 1 depicts an exemplary computing device suitable for implementing embodiments of the present invention.

Referring to the drawings in general, and initially to FIG. 1 in particular, an exemplary operating environment suitable for implementing embodiments of the present invention is shown and designated generally as computing device 100 (computing environment). Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, cloud computing environment, servers, nodes etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise computer storage media such as Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2:
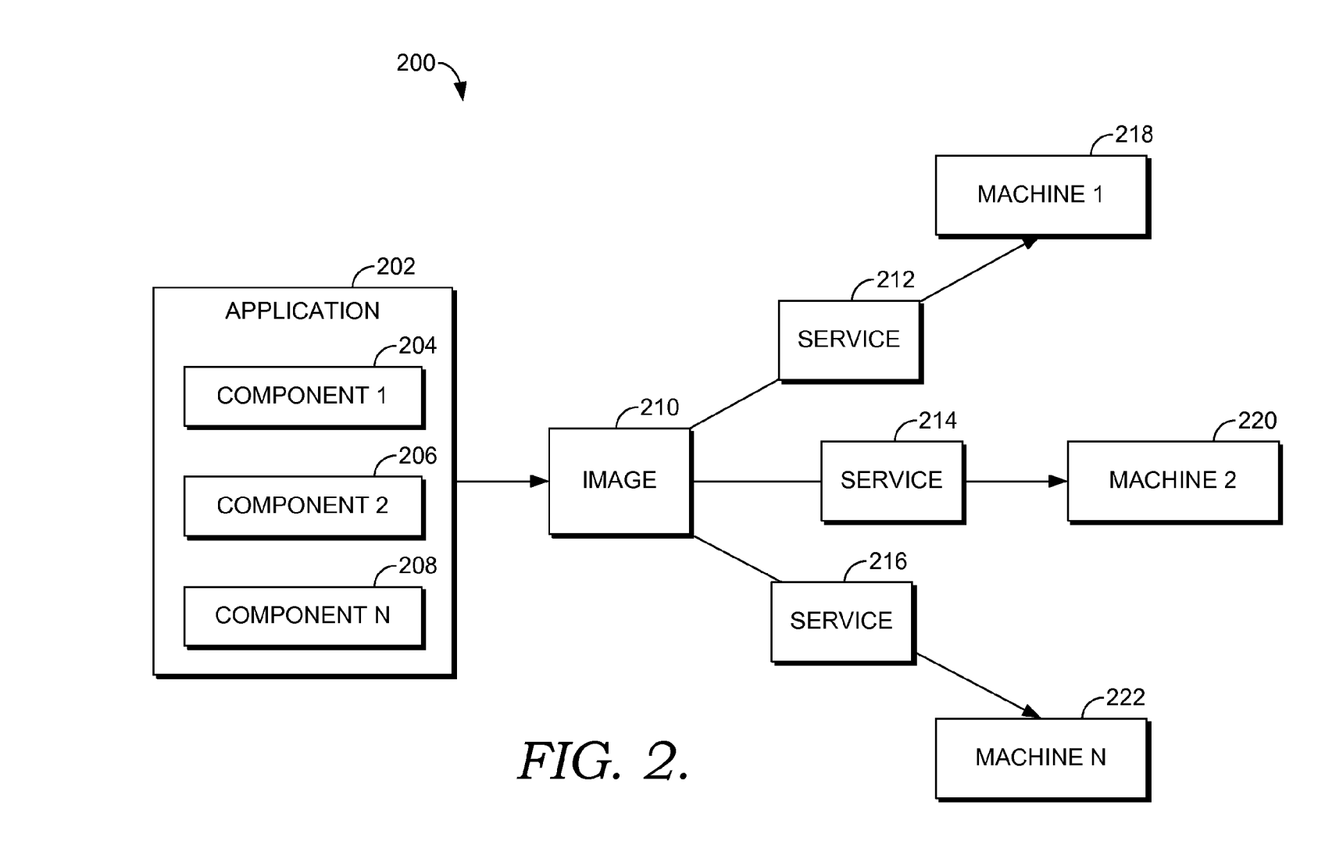
FIG. 2 depicts a block diagram illustrating an exemplary application distribution system in which embodiments of the present invention may be employed.

With reference to FIG. 2, a block diagram is provided illustrating an exemplary application distribution system 200 in which embodiments of the present invention may be employed. It should be understood that this and other arrangements described herein are set forth only as examples. Other arrangements and elements (e.g., machines, interfaces, images, components, and applications, etc.) can be used in addition to or instead of those shown, and some elements may be omitted altogether.

The application distribution system 200 may be employed as part of a distributed computing system. Examples of a distributed computing system include a cloud computing system or the like. For example, a cloud computing system is an Internet based computing system that shifts infrastructure (e.g., processing power, memory, resources) away from an end user to providers within the "cloud." The term cloud may be used as a metaphor for the Internet. Consequently, cloud computing represent, in an embodiment, a computing capability that provides an abstraction between the computing resource and underlying technical architecture (e.g., servers, storage, network), enabling convenient, on-demand network access to a shared pool of configurable computing resources that are capable of rapid provisioning and release with minimal management effort or service provider interaction.

The application distribution system 220 is comprised of an application 202. Application 202 is an exemplary application, such as a cloud application. An application utilizes cloud computing in the software architecture to reduce or potentially eliminate the need to install and/or run the application on an end user's computer. Consequently, an application delivered through the application distribution system 200 may alleviate the end user of software maintenance, the burden of ongoing operation and support. Examples of an application 202 include services used by an end user to perform computing tasks while maintaining at least a portion of the application code and infrastructure separate from a computing device used by the end user.

The application 202 is comprised of a number of components. For example, component 1 204, component 2 206, and component N 208. A component, in an exemplary embodiment, is a discreet portion of code of an application that provides functionality to an application. A component may be viewed, at least in some embodiments, as a building block, that when combined with other components, creates the ultimate functionality provided by an application. Consequently, the application 202 is built from a number of components (i.e., component 1 204, component 2 206, and component N 208), where each of the components, either alone or in combination, are responsible for various functions offered by a service of the application 202.

In an exemplary embodiment, when an application is updated in response to errors, flaws, new functionality, additional resources, additional options, changes in resources, etc., one or more components of the application are updated to facilitate the desired changes to be implemented within the application. As a result, an application may be updated by updating one or more components utilized by the application. Therefore, instead of updating all of the code that represents an application, portions or components of the application may instead be updated to reduce the resources required for an update. It is understood that a "component" as used herein is a portion or a whole of an application that provides functionality within a distributed computing system, such as a cloud computing system.

An application, such as the application 202, is developed by a developer. The developer, sometimes referred to as an owner of the application, identifies the functionality that the application is intended to provide, creates, coordinate, and/or identifies components that when used alone or in combination, provides the functionality of the application to a user. The developer may also desire to update the functionality provided by the application. In order to facilitate updating the functionality, the developer of the application may provide updates to one or more components.

Similarly, components utilized by an application may be developed by a third-party developer. A third-party developer may update a component and then offer the updated component for use by application. In an exemplary embodiment, a developer develops an application that is comprised of a number of components. The components comprising the application may be partially developed by the developer and also partially developed by a third-party developer. For those components of an application developed by a third-party developer, the third-party developer may notify the developer of updates to a particular component. In another embodiment, the third-party developer may not notify the developer of the updated component, but instead rely on the developer to discover the update on their own. Consequently, the developer, in this example, is responsible for identifying that a component update is available for a particular application utilizing the component. Reduced management and resource costs may be realized when a developer is not responsible for manually identifying component updates.

With continued reference to FIG. 2, an image 210, such as an application image, is a snapshot of the state of an application within a machine. For example, an image includes a snapshot of an application within a virtual machine. The snapshot may include variables, program counters, memory state, and the like. An image, such as the image 210, may be instantiated to provide a service, such as service 212, service 214, or service 216 for a requesting user. In an exemplary embodiment, the image 210 is a snapshot of the application 202 as operating within a virtual machine of a distributed computing environment.

Machine 1 218, machine 2 220, and machine N 222 are machines operating in a distributed computing environment. In an exemplary embodiment, the machine 1 218, machine 2 220, and machine N 222 are virtual machines functional for providing resource for a respective service. As discussed supra, a service is an instantiation of an image. Consequently, the machine 1 218, in this example, provides resources requested and required by the service 212. A virtual machine is an implementation of a machine (e.g., computing device) that executes computing code as if it was a physical machine. Therefore, in a cloud computing environment, virtual machines provide a framework that is conducive to expansion and contraction with minimal manual resources consumed.

In an exemplary embodiment, a developer of the application 202 provides the application 202 including a number of components, such as component 1 204. A distributed computing environment may include an operating environment, such as an operating environment provided under the trademark WINDOWS AZURE available from the Microsoft Corporation of Redmond, Wash., that is functional to generate the image 210 from the application 202. The image 210 is a snapshot of the application 202 within a machine, such as a virtual machine. When a service provided by the image 210 is requested, the image 210 is instantiated by an operating environment as a service, such as the service 212 that utilizes resource of a machine, such as the machine 1 218.

The various embodiments and examples provided in connection with FIG. 2 are exemplary in nature and not all inclusive. It is understood that additional processes, services, machines, networks applications, and the like may be implemented to achieve distribution of an application in a distributed computing environment.

Further many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 3:
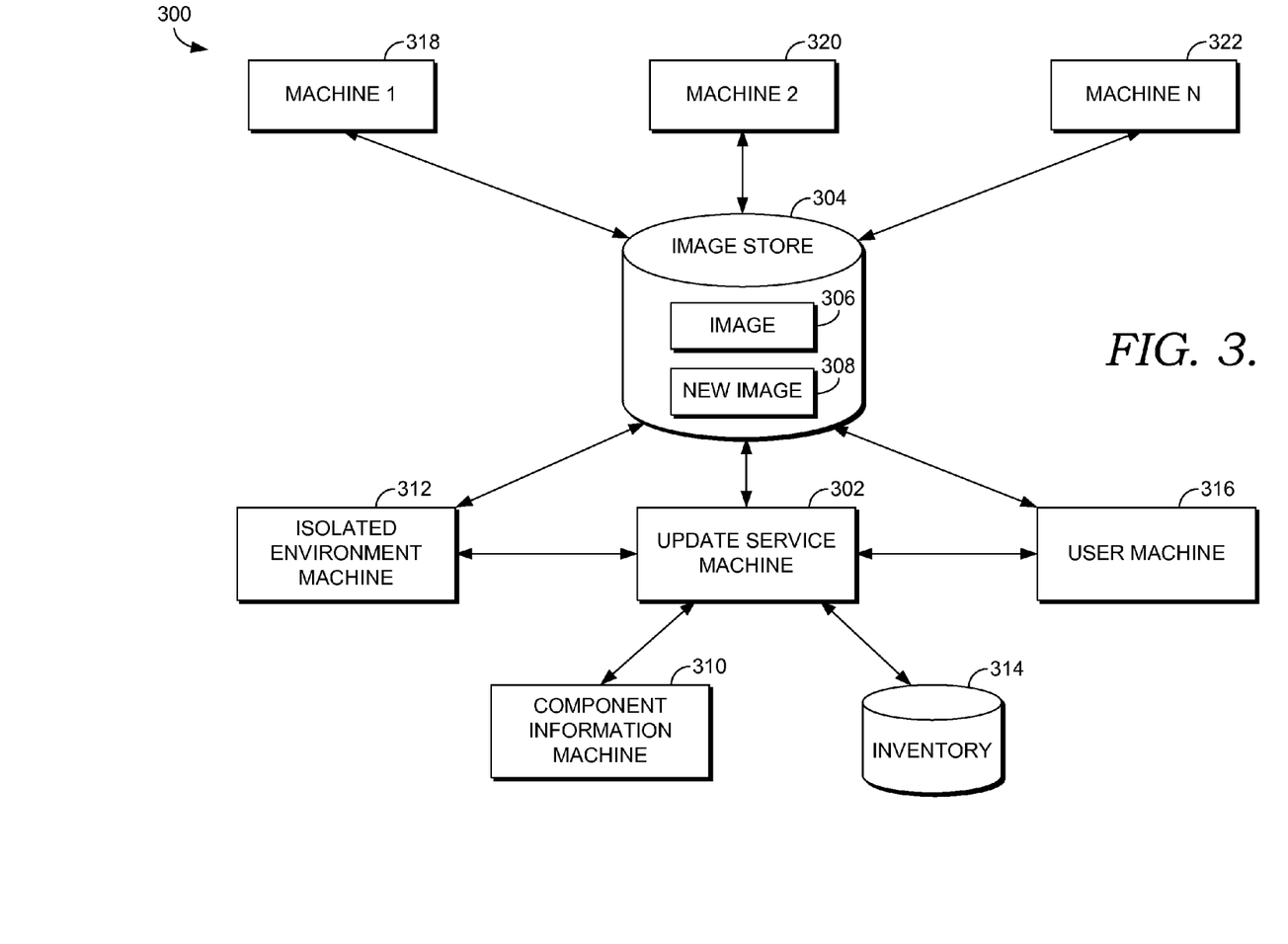
FIG. 3 depicts a block diagram illustrating an exemplary distributed computing environment in which embodiments of the present invention may be employed.

With reference to FIG. 3, a block diagram is provided illustrating an exemplary distributed computing environment 300 in which embodiments of the present invention may be employed. It should be understood that this and other arrangements described herein are set forth only as examples. Other arrangements and elements (e.g., machines, interfaces, images, components, and applications, etc.) can be used in addition to or instead of those shown, and some elements may be omitted altogether.

Among other components not shown, the environment 300 may include an update service machine 302, an image store 304, a component information machine 310, an isolated environment machine 312, an inventory 314, a user machine 316, a machine 1 318, a machine 2, 320, and a machine N 322. Each of the units shown in FIG. 3 may be any type of computing device, such as computing device 100 described with reference to FIG. 1, for example. The components may communicate with each other via a network (not shown), which may include, without limitation, one or more local area networks (LANs) and/or wide area networks (WANs). Such networking environments are commonplace in offices, enterprise-wide computer networks, intranets, and the Internet. It should be understood that any number of machines and stores may be employed within the environment 300 within the scope of the present invention. Additionally other units not shown may also be included within the environment 300

The update service machine 302 is a machine, either virtually or actually, that among other responsibilities manages and facilitates update of an image. In an exemplary embodiment, the update service machine is a virtual machine operating within a cloud computing environment. The image store 304 is a computer readable medium functional for maintaining one or more images, such as the image 306 and the new image 308. The update service machine 302 and the image store 304 communicate by way of one or more networks, such as the Internet. Similarly, other machines and stores of the exemplary distributed computing environment 300 communicate by way of one or more networks.

The user machine 316 is a machine, such as a computing device, utilized by a user, developer, and/or a third-party developer. For example, a developer may access an application developed by the developer for use within the distributed computing environment 300 by way of the user machine 316. In an additional embodiment, the user machine 316, like all machines of the distributed computing environment 300, may be a virtual machine.

The component information machine 310 is a machine, such as a computing device, a virtual machine, a process, an application, an agent, or the like, that is functional to identify and determine components utilized by applications operating within the distributed computing environment 300. For example, an application provided by a developer using the user machine 316 is analyzed by the component information machine 310 to identify and determine a plurality of components utilized by the application. Consequently, the component information machine 310, in this example, maintains a listing of the identified components as an inventory within the inventory 314.

The inventory 314, in an exemplary embodiment, is a data store for maintaining a listing or inventory of components utilized by one or more applications operating within the distributed computing environment 300. For example, the inventory 314 may be a computer readable medium that, in connection with a computing device, maintains and monitors the inventory of components relied upon by applications.

The isolated environment machine 312 is an isolated computing environment within the distributed computing environment 300. For example, an isolated computing environment, in an exemplary embodiment, is a virtual machine with limited resources and connections. In this example, the isolated computing environment is designed to prevent conflicts within a cloud computing environment, which prevents a disruption of service within the distributed computing environment. Conflicts may be prevented by restricting resources, connections, parameters, access, and other controls to limit a footprint of the isolated computing environment within a distributed computing environment. Conflicts within the distributed computing environment may be avoided in the update process by inhibiting or preventing the isolated computing environment from broadcasting (e.g., communicating) various resources associate with the component. The machine 1 318, machine 2 320, and machine N 322 are machines, virtual or physical, functional to provide resource for use by a service, such as an instantiation of an image (i.e., image 306, new image 308).

In an exemplary embodiment, the component information machine 310 creates and maintains an inventory of at the inventory 314 of all components utilized within the image 306. Consequently, when a developer, third-party developer, or the like provides an indication of an update for a particular component, the update service machine 302 receives this indication and accesses the inventory 314 to identify an application image that utilizes the component. In this exemplary embodiment, the update service machine 302 identifies the image 306 as including or utilizing the updated component.

Continuing with this example, the update service machine boots or executes the image 306 within the isolated environment machine 312. As previously discussed, the isolated environment machine 312 has limited resources and connections within the distributed computing environment 300 to prevent possible conflicts within the distributed computing environment 300. For example, instantiations of the image 306 may be running on the machine 1 320 (for example) concurrently with the update service machine 302 attempting to update the image 306. Therefore, to prevent the service operating on machine 1 318 from "seeing" or relying on parallel resources of the image 306 as it is booted in the isolated environment machine 312, the resources and connection of the isolated environment machine are controlled and limited to prevent potential conflicts.

Returning to the example, once the update service machine 302, which may be associated with or part of a fabric layer of a distributed computing environment, causes the image 306 to be executed within the isolated environment machine 312, the update for the component is applied. In a particular embodiment, an indication of the update is received by the update service machine 302; therefore, the update service machine 302 retrieves the update to be applied to the image 306. In an additional embodiment, the update is received by the update service machine (or other units of the distrusted computing environment) as part of the received indication.

In an embodiment, the update includes an update agent. The update agent is provided by a developer, a third-party developer, or the like to control and/or manage the update of a component. In an additional embodiment, the update agent may be provided by a fabric controller or other operating platform utilized by the distributed computing environment 300. The update agent, in an embodiment, marshals the update of the component within the isolated environment machine to allow the functionality of a resulting image to be maintained but yet allowing a particular component to be updated.

Continuing yet again with the example, the image 306 is updated with an updated component on the isolated environment machine. A snapshot of the updated image may be captured to generate the new image 308 that is stored within the image store 304. The new image 308, like the image 306, is a snap shot of the state of an underlying application. However, the new image 308 reflects utilization of an updated component unlike the image 306. In an exemplary embodiment, both the image 306 and the new image 308 are maintained within the image store 304. Further, in an exemplary embodiment, the image 306 is continued to be instantiated to provide a service at the various machines (e.g., machine 1 318) until the new image 308 is authorized by a user, developer or the like. In an additional exemplary embodiment, the new image 308 is automatically utilized to instantiate a service, while the image 306 is maintained for roll-back purposes.

In an exemplary embodiment verification is performed once a component is updated. The verification may be conducted by the isolated environment machine 312 or another machine of the distributed computing environment 300. The verification may include enumerating the update to ensure that it has been applied to the component. Additional verification may include identifying file names, extensions, logs or other indications of a properly applied update.

Once a new image 308 is stored in the image store 304, in an exemplary embodiment, a notification is provided to a developer, owner, controller or the like of the affected application. The notification may provide details indicating what update was applied, when it was applied, what was included with the update, what is affected by the update, and that a new image reflecting the updated component is available. In this example, a receiving entity of this notification may perform additional verification or provide a command to begin utilizing the new image 308 in place of the image 306. Or, as previously indicated, an exemplary embodiment automatically reboots services of the image 306 utilizing the new image 308.

Accordingly, any number of units, machines, and stores may be employed to achieve the desired functionality within the scope of embodiments of the present invention. Although the various units of FIG. 3 are shown with lines for the sake of clarity, in reality, delineating various components is not so clear, and metaphorically, the lines would more accurately be grey or fuzzy. Further, although some units of FIG. 3 are depicted as single blocks, the depictions are exemplary in nature and in number and are not to be construed as limiting.

Figure 4:
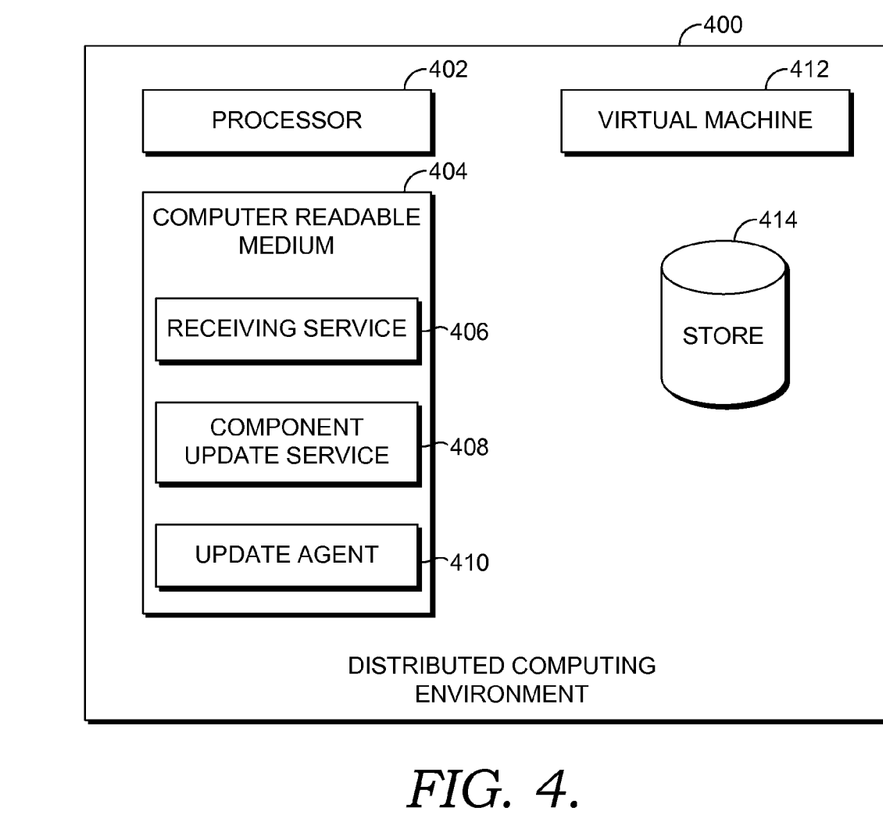
FIG. 4 depicts an exemplary distributed computing environment in accordance with embodiments of the present invention.

Turning to FIG. 4 illustrating an exemplary distributed computing environment 400 in accordance with embodiments of the present invention. The distributed computing environment 400 is comprised of, at least in part, a processor 402, computer readable medium 404, a virtual machine 412, and a store 414. The computer readable medium 404 is comprised of, at least in part, code for performing functions associated with a receiving service 406, a component update service 408, and an update agent 410. The elements illustrated and discussed herein with respect to FIG. 4 are exemplary in nature and are not limiting as to scope of the present invention. It is understood that additional element, machines, media, code, services, etc. may be implemented in the distributed computing environment 400. For example, while only a single virtual machine 412 is visually illustrated, in practice a plurality of virtual machine may be utilized at any time within the distributed computing environment 400

The processor 402 is a computing processor. In an exemplary embodiment the processor 402 is similar in nature to the processor(s) 114 previously discussed with respect to FIG. 1.

The computer readable medium 404 is a computer readable medium for use within the distributed computing environment 400. The computer readable medium 404, in an exemplary embodiment, is functional for maintaining one or more components, applications, services, and other functionality, that when executed by the processor 402, results in transformations of data, information, and other inputs within the distributed computing environment 400.

The receiving service 406 is, in an exemplary embodiment, functional for receiving an update to a component utilized by one or more applications in a distributed computing environment. For example, a component of an application may be updated by a developer of the component to patch a known conflict or error within the component. An indication of availability of the update is communicated from the developer to the distributed computing environment 400. The indication, which may be an electronic message, is received, in this example, by the receiving service 406. In response to receiving the indication, the update may be automatically requested by the receiving service 406 or other elements of the distributed computing environment 400. In an additional example, upon receiving the indication, the receiving service 406 may pass along the indication or a derivative of the indication to one or more other services/machines of the distributed computing environment 400 to determine if the update is relevant to an application residing or operating within the distributed computing environment 400.

Additionally, the receiving service 406 is functional to receive a component update, as opposed to receiving an indication of an update. For example, a developer of a component may "push" an update out to known users, subscribers, and/or services of the component. In this example, the receiving service 406 is functional to receive the update and allow one or more services/machines of the distributed computing environment 400 to utilize the update, such as to update a related component. Therefore, in an exemplary embodiment, the receiving service 406 is a service, when executed by a processor, that allows for the receiving of an update or an indication of an update.

The component update service 408 is functional to, among other responsibilities, identify a component within an application, inventory the component, identify from the inventory an application with the component, and facilitate the updating of the component with an update. In an exemplary embodiment, the component update service 408 is computer code, that when executed by the processor 402, facilitates the updating of a component utilized by an application within the distributed computing environment 400. In an exemplary embodiment, the component update service 408 is functionally equivalent to the update service machine 302 previously discussed with respect to FIG. 3. Therefore, as previously discussed, the update service machine 302 may be a virtual machine acting a service operating within a distributed computing environment.

In an exemplary embodiment, the component update service 408 is functional to automatically identify an application image (or an application) that utilizes or relies on a component that is available for update. As used herein, an application image and an application may be used interchangeably depending on a level of abstraction at which each is to be conceived. In an exemplary embodiment, an application may be conceptually thought of as a recipe or blueprint for building a series of code to cause one or more functions to be realized within a distributed computing system. An application image, in an exemplary embodiment, may be conceptually thought of as a snapshot of the application as executed/structured within a machine (e.g., virtual machine). Therefore, in an exemplary embodiment, the updating of a component of an application is merely the re-booting of an application within a machine so as to include an updated component as opposed to a previous (i.e., out dated) component that may have been called for in the application "recipe."

Further, in an exemplary embodiment, the component update service 408 is functional to execute an application image in a virtual machine within a distributed computing environment. As discussed previously, the execution of an application image for purposes of updating a component may be done in an isolated computing environment having limited network connection, resources, and/or access. In an exemplary embodiment, the execution of an application image in a virtual machine for purposes of updating a component is significantly different from a developer of the application from configuring the application for the updated component from a computing device under the direct control of the developer. For example, the executing of the application image in an isolated computing environment of the distributed computing environment does not require intervention by a third-party (e.g., developer) to cause the application image to be executed for update purposes. Additionally, automatically executing the application image within an isolated computing environment allows for optimization of resources by the distributed computing environment that may not otherwise be realized by a third-party. Further, in order for the application image to be booted in an isolated environment of the distributed computing environment, the component update service 408, not a third-party, identifies the application image as relying on or utilizing a component to be updated.

The update agent 410 is functional to update an application. For example, an image may be executed or booted in a virtual machine. The update agent 410 includes information that allows an update to a particular component being utilized within the application to be updated. As previously discussed, an update agent may be provided by a developer of the application, a developer (e.g., third-party developer) of the component, the operating system/controlling software of the distributed computing environment, and/or the like. Additionally, it is contemplated that an update agent is a combination of instructions, application program interfaces, services, computer applications, etc., that may be used in combination to facilitate updating an application.

In an exemplary embodiment, the component update service 408 facilitates updating of the component by employing (i.e., calling) the update agent 410 to marshal the update process for a particular application and/or component within an isolated computing environment. For example, the component update service 408 may call or cause the update agent 410 to begin an update of a component. In an additional embodiment, the update service 408 may reserve or call resources necessary for the update agent 410 to proceed with updating the component. Further yet, it is contemplated that the update agent 410 is provided by a third-party that is independent of the component update service 408. In this example, the component update service 408 facilitates the updating of a component by calling or notifying an update agent 410 that an update to a component may be initiated.

The virtual machine 412 is a virtual machine operating, at least in part, within the distributed computing environment 400. In an exemplary embodiment, the virtual machine 412 is an isolated computing environment for booting an application image, updating a component, and composing a new application image to reflect the updated component. In an additional exemplary embodiment, the virtual machine 412 is a computing device in which one or more instantiations of an application image are operating as services for a user of the distributed computing environment 400. As previously discussed, it is contemplated that a plurality of virtual machines, such as the virtual machine 412, are used when updating a component of an application in a distributed computing environment.

The store 414 is a data store for maintaining application images. For example, the store 414 may be incorporated within a distributed storage platform and functional for storing both an application image and a new application image that reflects an application following the update of a component. In an exemplary embodiment, the component update service 408 facilitates the storing, within the store 414, of a "new" application image following the update of a component.

In an exemplary embodiment, an application is available within the distributed computing environment 400. The component update service 408 determines the components that are utilized by the application and generates an inventory of those components. The receiving service 406 receives an indication from a third-party developer that an update is available for a component that is being utilized within the distributed computing environment 400. The component update service queries the inventory to identify that the component is called for within the application. Consequently, the receiving service 406 requests and receives the update from the third-party developer. Upon receipt of the update, the component update service 408 causes the application image to be executed within an isolated computing environment provided by the virtual machine 412. The booting within the isolated computing environment allows the update agent 410 to cause the component to be updated without causing potential conflicts throughout the distributed computing environment 400. Following the update of the component, the component update service 408 verifies the component has been updated. The component update service 408 causes a snapshot of the updated application to be generated, which results in a "new" application image from which a service can be instantiated. This new application image is then stored within the store 414 for access by a developer/controller of the application to implement for future instantiations of the service.

In an exemplary embodiment booting of an application within an isolated computing environment occurs without human intervention. For example, a user is not required to initiate or approve the booting of an application image for purposes of updating a component or capturing a new application image. Similarly, human intervention is not required, in an exemplary embodiment, for causing any of the functionality discussed herein with respect to the component update service to occur or be realized. As a result, updating of a component utilized by an application may be automated while maintaining features particular to the application prior to update of the component.

As similarly stated for FIG. 3, any number of units, machines, services, and stores may be employed to achieve the desired functionality within the scope of embodiments of the present invention. Although the various units of FIG. 4 are shown with lines for the sake of clarity, in reality, delineating various components is not so clear, and metaphorically, the lines would more accurately be grey or fuzzy. Further, although some units of FIG. 4 are depicted as single blocks, the depictions are exemplary in nature and in number and are not to be construed as limiting.

Figure 5:
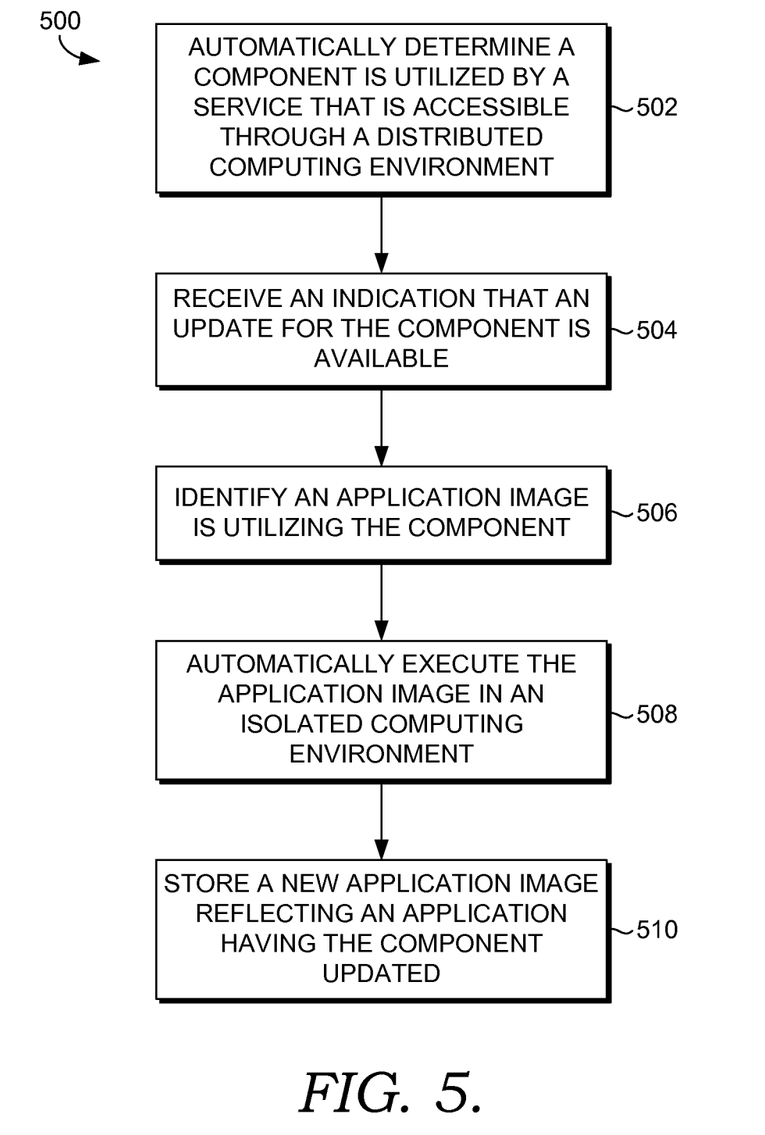
FIG. 5 depicts a flow diagram illustrating a method for updating an application image with a component in a distributed computing environment that is in accordance with an embodiment of the present invention.

FIG. 5 depicts a flow diagram illustrating a method 500 for updating an application image with a component in a distributed computing environment that is in accordance with an embodiment of the present invention.

At a block 502 a component is automatically determined to be utilized by a service that is accessible through a distributed computing environment. A component is utilized by a service when an underlying application calls for the component to be used in order for one or more functionalities to be achieved by an instantiation of a related application. As previously discussed, an instantiation of an application image may result in a service being performed within the distributed computing environment to perform one or more desired functions. Automatic determination of components allows for the distributed computing system to remain autonomous from manual intervention for purposes of updating an application. Consequently, efficiencies within the update process are realized and available.

At a block 504, an indication that an update for the component is available is received. In an exemplary embodiment, the indication is the receipt of the update or at least a portion of the update (e.g., code, code segments). In an additional exemplary embodiment, the indication is a notification that automatically calls for an inventory of components utilized within the system to be evaluated. Further yet, the indication is a notification, which is entered into a queue, for causing an update process to begin once a predetermined threshold is achieved (e.g., a number of components are available for update, time duration passing, level of resources available).

Further, receiving an indication that an update is available for the component may, in an exemplary embodiment, include facilitating the addition or removal of the component at a developer's request. For example, a developer that would like to update an image containing or that will contain the component provides the indication that an "update" is available. In this example, an "update" to the component includes adding and/or removing the component, in whole or in part, to/from the application image. Therefore, a developer may request that a particular component is added or removed to/from the application image by way of sending an indication that an update to the component is available. Consequently, it is understood that in an exemplary embodiment receiving an indication of an update includes receiving an indication that a component is to be added and or removed from an application image.

At a block 506 an application image that is utilizing a component to be updated is identified. In an exemplary embodiment a previously generated inventory of component utilized by a plurality of application is referenced to identify which of those pluralities of applications rely on the component for which an update has been received. The identification of an application image may be accomplished by identifying which application utilizes the component and as a result a related application image to the application is identified. In an exemplary embodiment, the application image is booted in an isolated environment for a component to be updated, but in an additional embodiment, the application is reconstructed in the isolated environment to result in a new application image that reflects the updated component.

At a block 508 the application image identified in the block 506 is automatically executed in an isolated computing environment. Automatically executing the application or application image avoids requiring resources of a developer or owner of the underlying application from manually intervening to cause the components to be updated. Consequently, efficiencies may be achieved such as reducing the time between reception of an indication for an update and the actual booting of the application image within an isolated environment. Additionally, the component may be updated within an application without requiring previously applied customizations to be re-applied manually by a developer as a result of the component update. For example, instead of updating a generic base image for an application and the requiring the developer to apply customization features (e.g., features particular to the application image) and elements to the application, by automatically booting the existing application image, the previously applied customization for the application may be maintained or preserved while still updating the component within.

At a block 510 a new application image is stored to reflect the application having the component updated. In an exemplary embodiment, an application image is booted/executed within an isolated computing environment as indicated at the block 508. An update for the component is applied to the component within the isolated computing environment; after which, the update may be verified as having been applied.

In an exemplary embodiment, the new application image is stored within the distributed computing environment with a unique name that follows a defined naming convention. In this example, both the application image prior to the component upgrade and the application post component upgrade are maintained within the system. A notification is sent to a user, such as the developer of the application, indicating that the new application image is available and that, with authorization, future instantiations of the application will be based from the new image. A defined naming convention allows the user to easily identify the newer application image when determining if it should be used for future instantiations of the application.

Figure 6:
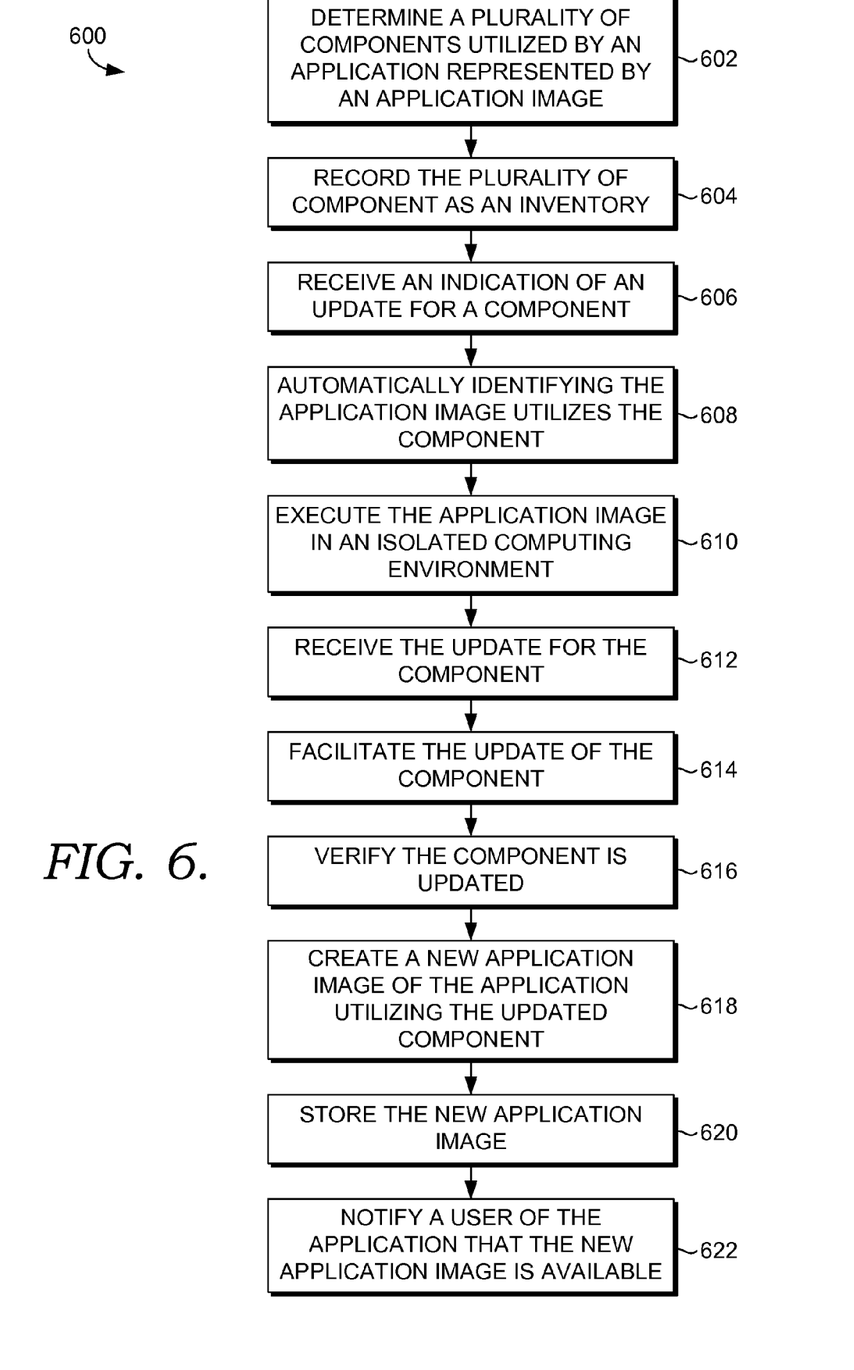
FIG. 6 depicts another flow diagram illustrating a method for updating an application image with a component in a distributed computing environment that is in accordance with an embodiment of the present invention.

FIG. 6 depicts a block diagram illustrating a method 600 for updating an application image with a component in accordance with embodiments of the present invention.

At a block 602 a plurality of components utilized by an application represented by an application image are determined. For example, based on a review of an application that calls out various components, the components are recorded as an inventory, as indicated at a block 604. The inventory of components may include additional information, such as resources, permissions, restrictions, and the like. In an exemplary embodiment, the inventory is maintained as an electronically searchable format that facilitates identification of application and application images that utilize various components.

At a block 606 an indication of an update for a component is received. As previously discussed, the indication may be a notification that an update is available. Or, in an additional exemplary embodiment, the indication of an upgrade includes the code necessary to cause the update of the component. The indication includes identification as to which component it is associated. For example, the indication may identify the component by a file name, a code, or another commonly used naming convention.

At a block 608, an application that utilizes the component is automatically identified from the inventory. For example, based on recording to the inventory discussed at the block 604, an application and an application image is identifiable based on a correlation between the known components of applications and the component associated with the received indication.

At a block 610 the identified application image is executed in an isolated computing environment. The isolated computing environment, in an exemplary embodiment, is a virtual machine within a cloud computing environment in which the virtual machine has limited connections and resources.

At a block 612 an update associated with the indication received at the block 606 is received. In this exemplary embodiment, the reception of the update may be a result of a "push" by an entity (e.g., developer) or a "pull" by one or more services and machines of the distributed computing environment.

At a block 614 the update of the component is facilitated. In an exemplary embodiment, facilitating update of the component is achieved by allowing an update agent provided by a developer to cause a patch to be applied to the application or component. In an exemplary embodiment, the facilitating the update include acquiring or reserving resources that allow the update to occur. Additionally, facilitating the update includes actually causing the update to occur.

At a block 616 verification that the component has been updated occurs. As discussed previously, the verification may include identifying a particular new file name extension (e.g., *.dll) or the like that is being utilized by a resulting instantiation of the application.

At a block 618 a new application image of the application utilizing the updated component is created. Creation of a new application image, in an exemplary embodiment, includes generating a snapshot of the state of the isolated computing environment while executing the application.

At a block 620 the new application image is stored within the distributed computing environment. As discussed previously, the application image and the new application image may both be maintained within the distributed computing environment to facilitate rollbacks and other trouble shooting processes. When a service defined by the application is requested, the new application image may be instantiated to provide the requested new instances of the service.

At a block 622 a user of the application is notified that a new application image is available. For example, a developer of the application, in an exemplary embodiment, is a user of the application. Similarly, an owner, controller, and other interested parties, in exemplary embodiment, are users of the application.

Further, in an embodiment, the notification provided to a user includes in indication that the new application is available and where the new application is maintained. Similarly, the notification may also include details related to the component and/or the update as applied to the new application image. Further, the notification, in an embodiment where the new application image is being used for instantiations of the service, includes information useable for rolling back to the previous application image prior to updating of the component.

In response to this notification, the user may provide a response that a particular application image is to be sued for the instantiation of a service. Consequently, a user selection as to which image is to be sued for instantiating a related service is received by the distributed computing environment, which facilitates offering the related service to one or more entities.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more computer storage media devices having computer-executable instructions embodied thereon, that when executed by a computing system having a processor and memory, cause the computing system to perform a method for updating an application image with a code component, the method comprising:
   determining a code component is utilized by a service that is accessible through a distributed computing environment, wherein the service is an instantiation of an application within the distributed computing environment represented by an application image;
   receiving an indication that an update for the code component is available;
   identifying the application image is utilizing the code component;
   executing the application image in an isolated computing environment of the distributed computing environment to update the code component;
   employing an update agent to apply the update to the code component within the isolated computing environment;
   storing, within the distributed computing environment, a new application image reflecting the application having the code component updated; and
   receiving an indication to instantiate the application image instead of the new application image for a new instance of the application.

2. The one or more computer storage media devices of claim 1, wherein the determination of code components is an inventory provided by a developer of the application.

3. The one or more computer storage media devices of claim 1, wherein the indication is received from a source of the code component.

4. The one or more computer storage media devices of claim 1, wherein identifying the application image is utilizing the code component is accomplished without intervention by a user.

5. The one or more computer storage media devices of claim 1, wherein identifying the application image is utilizing the code component includes referencing an inventory of code components utilized by the application.

6. The one or more computer storage media devices of claim 1, wherein the isolated computing environment is a virtual machine having defined network connections within the distributed computing environment.

7. The one or more computer storage media devices of claim 1, wherein the isolated computing environment includes parameters that facilitate updating the code component without disrupting the distributed computing environment.

8. The one or more computer storage media devices of claim 1, wherein the isolated computing environment is a resource within the distributed computing environment that is not controlled by a user of the application.

9. The one or more computer storage media devices of claim 1, wherein the isolated computing environment prevents the service from broadcasting resources associated with the code component.

10. The one or more computer storage media devices of claim 1, wherein the new application image preserves features particular to the application image.

11. The one or more computer storage media devices of claim 10, wherein the features are customizations to the application.

12. The one or more computer storage media devices of claim 1, wherein the method further comprises maintain the application image following the storing of the new application image.

13. The one or more computer storage media devices of claim 1, wherein the method further comprises notifying a user of the application that the new application image is stored within the distributed computing environment.

14. The one or more computer storage media devices of claim 13, wherein the method further comprises receiving an indication from the user to instantiate the new application image for new instances of the application.

15. A computer system for performing a method for updating a code component of an application image, the computer system comprising a processor coupled to a computer storage medium, the computer storage medium having stored there on a plurality of computer software executable by the processor, the computer software comprising:
 a receiving service receiving an update to a code component utilized by one or more applications in a distributed computing environment;
 a code component update service identifying an application image, for an application of the one or more applications, capable of utilizing the code component;
 the code component update service executing the application image in a virtual machine that is an isolated computing environment within the distributed computing environment;
 the code component update service facilitating an update agent with applying the update to the code component in the isolated computing environment;
 the code component update service facilitates storing a new image of the application; and
 a component that receives an indication to instantiate the application image instead of the new application image for a new instance of the application.

16. The system of claim 15, wherein executing the application image in the virtual machine operates without human intervention.

17. The system of claim 15, wherein the new image automatically maintains features particular to the application image.

18. One or more computer storage media devices having computer-executable instructions embodied thereon, that when executed by a computing system having a processor and memory, cause the computing system to perform a method for updating an application image with a code component, the method comprising:
 determining a plurality of code components utilized by an application that is represented by an application image;
 recording the plurality of code components as an inventory;
 receiving an indication of an update for a code component of the plurality of code components;
 identifying, from the inventory, the application image utilizes the code component;
 executing the application image in an isolated computing environment of the distributed computing system;
 receiving the update for the code component at the isolated computing environment;
 facilitating update of the code component within the isolated computing environment;
 verifying the code component is updated within the isolated computing environment;
 creating a new application image of the application utilizing the updated code component;
 storing the new application image within the distributed computing environment; notifying a user of the application that the new application image is available within the distributed computing environment; and
 receiving an indication to instantiate the application image instead of the new application image for a new instance of the application.

* * * * *